United States Patent [19]

Krauska

[11] Patent Number: 5,704,249
[45] Date of Patent: Jan. 6, 1998

[54] SCREW DRIVE MECHANISM FOR ARTICULATED BEDS AND THE LIKE

[75] Inventor: Bernard Krauska, Stevens Point, Wis.

[73] Assignee: Joerns Healthcare, Inc., Stevens Point, Wis.

[21] Appl. No.: 572,667

[22] Filed: Dec. 14, 1995

[51] Int. Cl.[6] ........................................ F16H 1/20
[52] U.S. Cl. ..................... 74/424.8 A; 74/89.15; 403/366
[58] Field of Search ............... 74/424.8 A, 499, 74/89.15; 403/129, 366, 397, 196, 1

[56] References Cited

U.S. PATENT DOCUMENTS

| | | |
|---|---|---|
| 1,419,906 | 6/1922 | Klausmeyer . |
| 1,630,735 | 5/1927 | Ferrell . |
| 1,678,731 | 7/1928 | Klauset ........................ 74/424.8 A |
| 1,905,569 | 4/1933 | Rapellin ........................ 74/424.8 A |
| 2,294,745 | 9/1942 | Goetz . |
| 2,791,129 | 5/1957 | Russell . |
| 3,667,730 | 6/1972 | Kollmar . |
| 4,023,431 | 5/1977 | Pavlas . |
| 4,056,795 | 11/1977 | Whelan ........................ 74/424.8 A |
| 4,176,561 | 12/1979 | Davidson . |
| 4,364,282 | 12/1982 | Nilsson . |
| 4,569,242 | 2/1986 | Hu ............................... 74/424.8 A |
| 4,917,524 | 4/1990 | Wilcox .......................... 403/366 |
| 5,032,048 | 7/1991 | Walton et al. . |
| 5,461,935 | 10/1995 | Hill ............................ 74/89.15 |

*Primary Examiner*—Charles A. Marmor
*Assistant Examiner*—David M. Fenstermacher
*Attorney, Agent, or Firm*—Price, Heneveld, Cooper, DeWitt & Litton

[57] ABSTRACT

A screw drive mechanism for articulated beds and the like includes a drive shaft having external screw threads, a segmented drive nut having internal threads which engage the external threads of the shaft and a drive member in which the segmented drive nut is retained. At least one spring clip is disposed radially between the segmented drive nut and the drive member and engages the same to axially position and retain the drive nut in the drive member. The arrangement provides a simpler, less expensive drive screw mechanism which can be snapped together without tools and which can be easily disassembled for servicing.

20 Claims, 3 Drawing Sheets

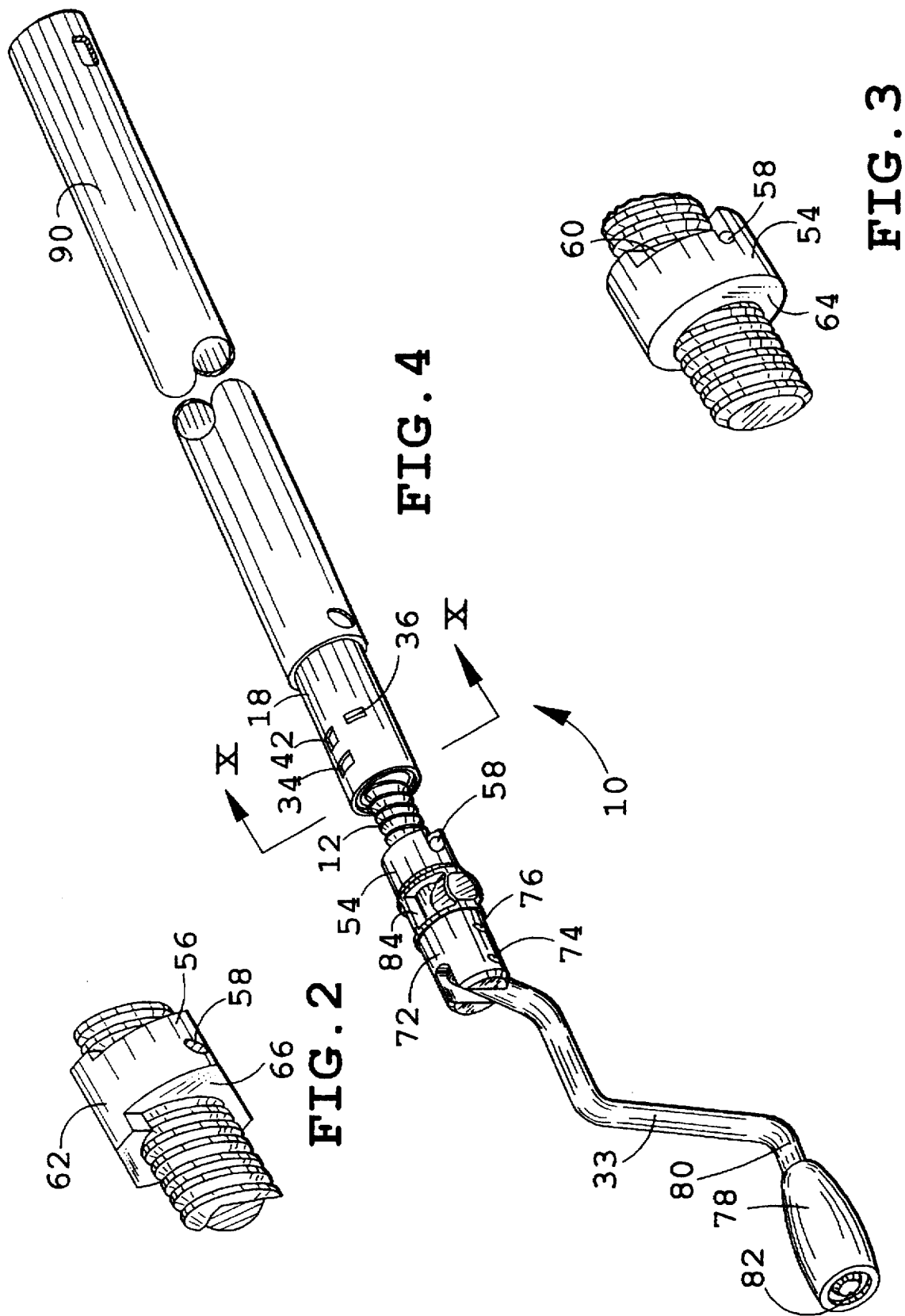

SCREW DRIVE MECHANISM FOR ARTICULATED BEDS AND THE LIKE

BACKGROUND OF THE INVENTION

This invention relates to a screw drive mechanism for articulated beds and the like, and more particularly to an economical nut mounting arrangement which has fewer components and, can be easily manufactured and quickly assembled.

Known screw drive mechanisms generally comprise a plurality of machined components which are held together by threaded collars, threaded fasteners, or a combination thereof. Because of the plurality of machined components, such screw drive mechanisms are relatively expensive to fabricate. One-piece drive nuts must be threaded onto their associated drive screw and are therefore rather difficult to assemble. Such assembly often requires careful positioning of a plurality of components, which must be temporarily held in a fixed relationship to one another by fixtures or the like, while tools are used to tighten threaded collars, threaded fasteners, etc. to hold the various components together.

Split drive nuts reduce the amount of time needed to mount the drive nut onto its associated screw during assembly. Heretofore, split nut assemblies have generally employed threaded fasteners or threaded collars to hold the various segments of the split nut together and to interconnect other portions of the assembly. Consequently, many of the assembling and manufacturing problems associated with a one-piece drive nut remain unmitigated.

Additionally, prior split drive nut assemblies have generally included two or more separate drive nut segments which are different from one another, thus requiring separate production apparatuses and/or procedures for each portion of the split nut. The need for separate casting, stamping and tooling for the production of each portion of the split nut increases the overall expense of manufacturing and assembling the completed screw drive mechanism.

Other known split drive nut arrangements typically require a separate retainer pin for securing the drive nut against longitudinal movement within a frame through which the screw drive is operated. These constructions increase the amount of time and effort expended during assembly and are relatively heavy and bulky. The excessive bulk and mass of known screw drive mechanisms has several disadvantages associated therewith, including greater difficulty in moving, and expense in shipping, apparatuses or devices employing such drive mechanisms, undesirable aesthetics in some applications, and the need for larger housings for certain types of devices incorporating such drive mechanisms. The relatively large size and high profile of such devices makes it difficult to design a clean and compact drive system.

Some known screw drive mechanisms are also generally not particularly adapted for easy service.

SUMMARY OF THE INVENTION

This invention provides an improved axial screw drive arrangement having a drive mechanism comprised of an axially rotatable, externally threaded drive shaft, a segmented or split drive nut, a drive member having a hollow end in which the split nut is received, and a spring clip disposed radially between the segmented drive nut and the interior end portion of the drive member and engaging the same to axially position and retain the segmented drive nut in the drive member. The split drive nut is comprised of at least two segments or halves having interfitting alignment features which facilitate and insure proper assembly.

The axial screw drive mechanism of the present invention is comprised of fewer components which are generally easier to fabricate and thus less expensive. Because the invention uses fewer and less expensive components, it is easier to assemble and has a lower overall cost as compared with previously known axial screw drive mechanisms. The components used in the axial screw drive mechanism of the invention are substantially free of machined holes and surfaces. Additionally, no threading operations are required during assembly, thus the screw drive mechanism of the invention can be assembled without tools and can be easily disassembled for servicing. The spring clips used for maintaining a fixed relationship between the drive nut and the drive member is generally disposed between the interior walls of the drive member and recesses in the segments of the drive nut, and therefore do not add to the size or bulk of the mechanism. The resulting screw drive mechanism of the invention is generally smaller, lighter and less bulky than known screw drive mechanisms capable of serving similar functions and handling similar loads.

BRIEF DESCRIPTION OF THE DRAWINGS

FIG. 2 is an enlarged perspective view of a stop mounted at one end of the threaded shaft of the mechanism;

FIG. 3 is an enlarged perspective view of a stop mounted at the other end of the threaded shaft;

FIG. 4 is a perspective view of the assembled screw drive mechanism;

DESCRIPTION OF THE PREFERRED EMBODIMENT

Figure 1:
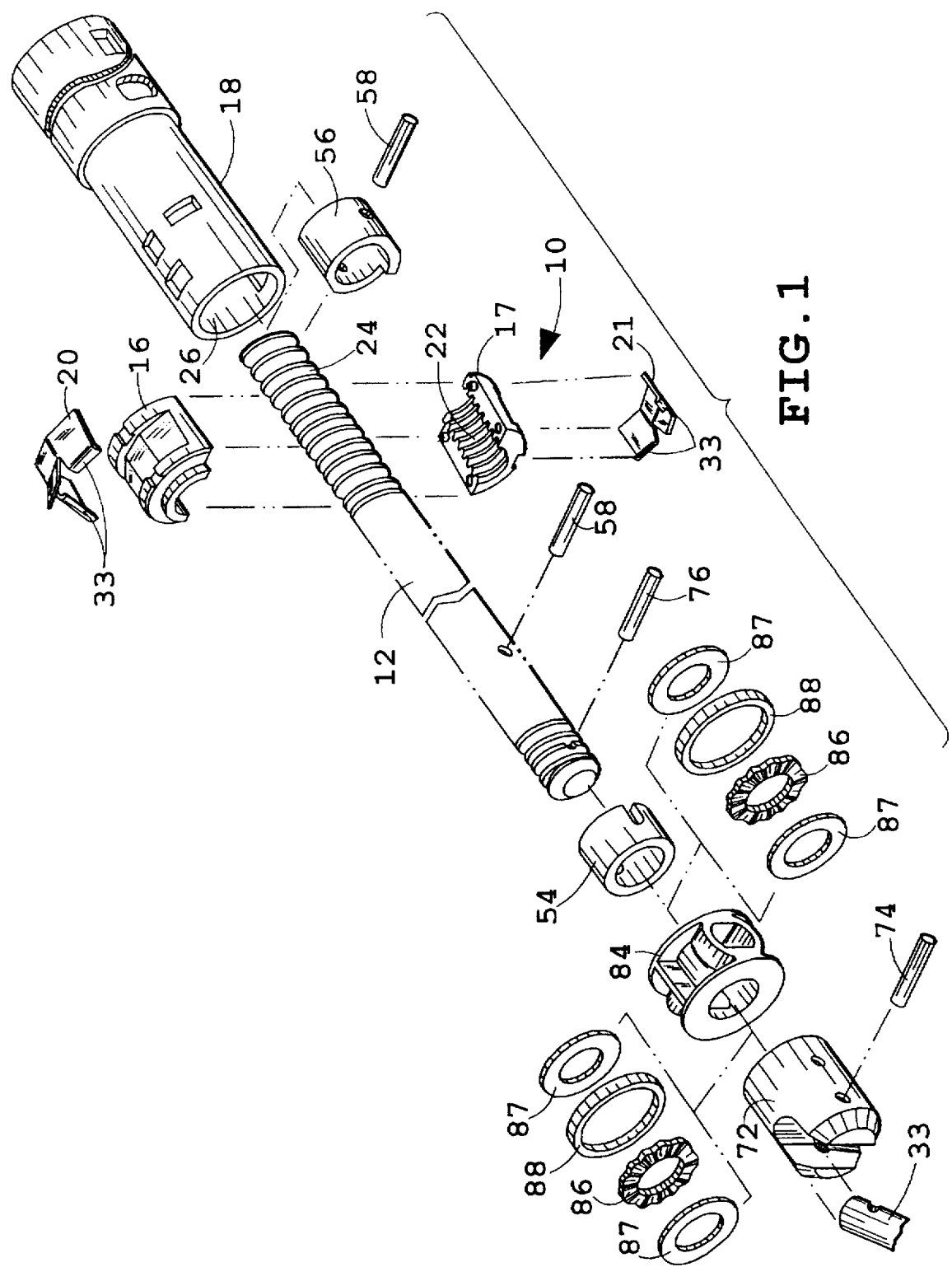
FIG. 1 is an exploded perspective view of the screw drive mechanism of the present invention which illustrates assembly thereof.

With reference to the drawings, especially FIGS. 1 and 4, there is shown a screw drive mechanism 10 in accordance with the principles of the invention. The mechanism 10 is comprised of a drive assembly including an externally threaded shaft 12, a split or segmented drive nut having two halves or segments 16, 17, a tubular drive member 18 which is connected to a member (not shown) which is to be reciprocated by the mechanism, and spring retainer clips 20, 21 which are, upon complete assembly of the mechanism, disposed between and engaged by the outer curved wall of the segmented nut and the interior wall of the tubular drive member to maintain the segmented nut in fixed relationship to the drive member.

The two segments 16, 17 of the split drive nut are each provided with internal screw-threads 22, which engage external screw-threads 24 on shaft 12. The two segments 16 and 17 are preferably identical to eliminate the need for separate tools, apparatuses, and/or procedures for fabricating each of the segments. Another advantage of using identical segments 16, 17, which can be combined or made to form a whole nut, is that any chance of providing nut segments which are incompatible, i.e. not combinable to form a whole nut, is substantially eliminated. The segments of the drive nut are retained within a hollow end 26 of tubular drive member 18 by means of a pair of spring clips 20, 21. Spring clips 20, 21 hold the segmented drive nut in a fixed relationship with drive member 18 so that during operation of the drive mechanism 10, drive member 18 moves translationally with the drive nut generally along a line coincident with the rotational axis of threaded shaft 12, when the threaded shaft is rotated.

Figure 5:
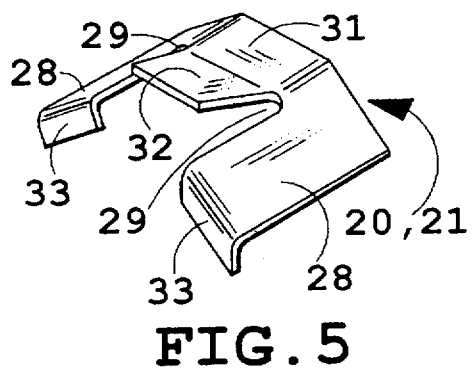
FIG. 5 is an enlarged perspective view of one of the spring clips used to axially position and retain the drive nut in the drive member.
Figure 6:
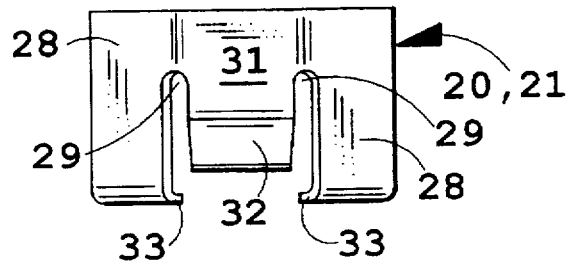
FIG. 6 is a top plane view of the spring clip shown in FIG. 5.
Figure 7:
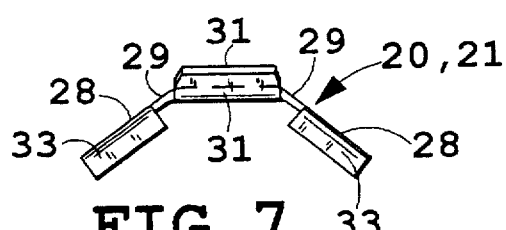
FIG. 7 is a front-end view of the spring clip shown in FIGS. 6 and 7.
Figure 8:
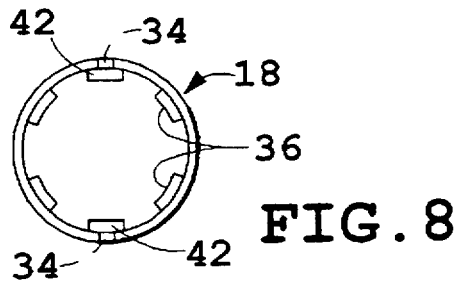
FIG. 8 is an end view of the drive tube in which the segmented drive nut is retained, along lines XIII—XIII of FIG. 4.
Figure 10:
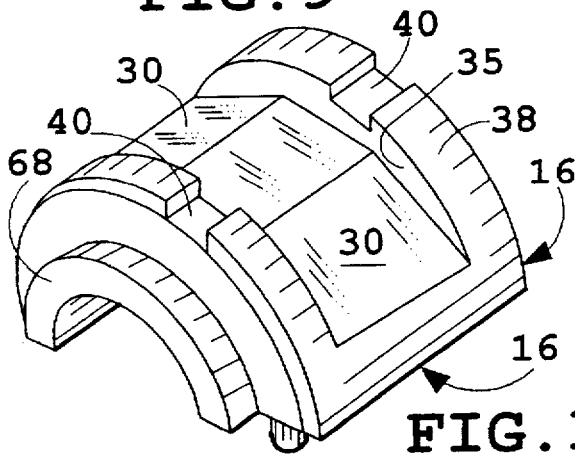
FIG. 10 is an enlarged perspective view of one of the segments of the split nut, showing the outer side thereof.

Each spring clip 20, 21 (FIGS. 5, 6 and 7) is comprised of a curved or bent piece of resilient sheet material. The spring clips are preferably stamped from metal sheet material such as steel or aluminum. Each spring clip 20, 21 is formed from a generally rectangular piece of metal sheet. A pair of spaced, generally parallel, narrow notches 29 extend from one edge of the metal sheet toward the opposite edge thereof to provide a central portion 31 and adjacent wing portions 28. During the stamping operation, wing portions 28 are bent downwardly away from the plane of the central portion along lines generally coincident with notches 29, and part of the central portion 31 between notches 29 is bent upwardly, generally along a line which is perpendicular to the length direction of the notches 29, to form a projecting tab 32. The ends of the wing portions 28 on the side of the clip in which the notches 29 are cut are preferably bent downwardly at about a 90 degree angle to form projections 33 which are received within deep grooves 35 (FIG. 10) to provide positive engagement between the spring clips and the nut segments. Wing portions 28, upon complete assembly of the mechanism, are positioned in recesses 30 (FIG. 10) on the exterior walls of nut segment 16, 17. Spring tabs 32 are resiliently biased radially outwardly and pass through rectangular aperture 34 in the walls of tubular drive member 18. Tabs 32 engage slot 34 to hold nut halves 16, 17 in threaded engagement with shaft 12, and urge drive member 18 in a direction toward crank lever 33 when threaded shaft 12 is rotated in an appropriate direction to the drive nut toward lever 33.

Figure 9:
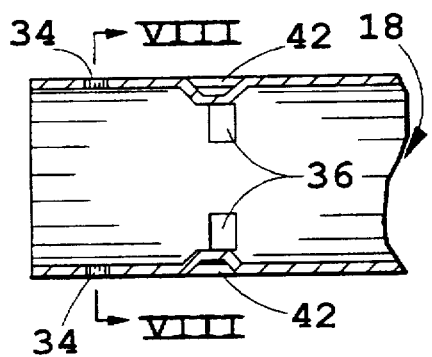
FIG. 9 is a fragmented, longitudinal cross-sectional view of the end of the drive tube without the segmented nut disposed therein.
Figure 9A:
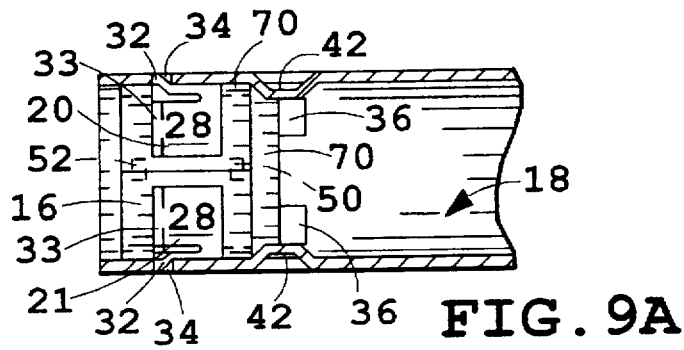
FIG. 9A is a fragmented, longitudinal cross-sectional view of the end of the drive tube in which the segmented nut is retained, showing a center tab of the spring clip engaged within an aperture of the drive tube and showing bosses which engage edges of the segmented nut.

The hollow end 26 of tubular drive member 18 in which the drive nut is received includes a plurality of flaps 36 (FIGS. 4, 8, 9 and 9A) which project inwardly into the hollow space within the tubular drive member 18, as shown in FIGS. 9 and 9A. Flaps 36 are formed by suitably cutting three sides of a rectangular shape into the wall of the tubular drive member 18, and bending the flap inwardly along the remaining uncut side of the rectangle. Flaps 36 are engaged by the edges of the drive nut which are on the side thereof farthest from crank lever 33, so that drive member 18 is moved along with the drive nut when it is driven in a direction away from lever 33 by appropriate rotation of externally threaded shaft 12. The radially outermost surfaces 38 of each of the nut segments 16, 17 are generally located along the external perimeter thereof. The nut segments are preferably comprised of molded plastic. Surfaces 38 are preferably very closely spaced from, or proximate to, the interior walls of tubular drive member 18, so that proper positioning and radial compression of segment 16, 17 with respect to each other, and onto threaded shaft 12 is primarily maintained by the walls of tubular drive member 18.

Relative movement of the drive nut with respect to drive member 18 is prevented by a combination of features comprising spring clips 20, 21 having resiliently, outwardly biased tab portions 32 which engage apertures 34 in the drive member, and flaps 36 which engage lateral edges of the drive nut. It will be appreciated that alternative arrangements are possible wherein the positioning of the tabs, apertures and flaps can be different. For example, it is possible to position the clip within a recessed area on the interior of the drive tube and have a tab extending from the drive tube and engaging an aperture in the spring clip to prevent relative longitudinal movement between the drive nut and the drive member 18. The segmented drive nut is prevented from rotating relative to drive tube 18 by one of a pair of rectangular slots or recesses 40 (FIG. 10) provided on each of nut segments 16, 17, and by rectangular shaped projections or bosses 42 (FIGS. 4 and 9) which project from the wall of drive member 18 inwardly toward recesses 40. Alternative arrangements for positively interconnecting the drive member and drive tube for axial rotational motion are possible. For example, a projection can be provided on the drive nut for engaging a slot in the drive member. Because spring clips 20, 21 are fitted within recesses on the outer curved surfaces of nut segments 16, 17, spring clips 20, 21 serve the function of helping to establish a fixed relationship between the nut segments and drive member 18 without requiring any additional space which would add to the volume or bulk of the mechanism.

Figure 11:
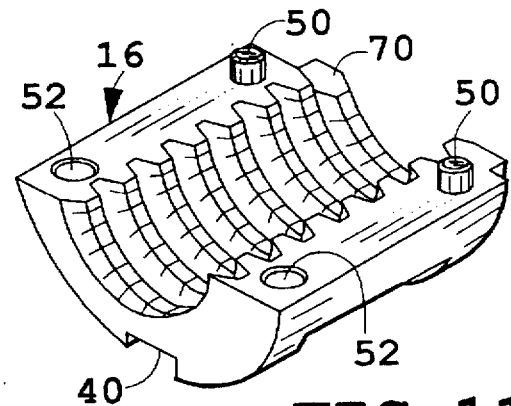
FIG. 11 is an enlarged perspective view of the nut segment of FIG. 10, showing the radially inner side thereof.

In order to further facilitate assembly of the mechanism, the segments 17, 18 of the split drive nut include engagement surfaces 48 having interfitting alignment elements, including projections or pins 50 (FIG. 11) and slot or recesses 52 which are adapted to receive projections 50 on the other nut segment. The alignment elements 50 and 52 help insure proper positioning of the two nut halves with respect to each other and onto threaded shaft 12. Most preferably, the two segments 17, 18 are identical to each other to eliminate the need for separately manufactured components requiring different production procedures and apparatuses. It is also desirable that the nut segments 16, 17 are symmetrical with respect to a plane transverse to the internal threads thereof. This further simplifies assembly and reduces the possibility of improper assembly, by allowing the two segments to be installed in either of two different orientations which are 180 degrees apart with respect to the axis of the threaded shaft 12.

Stop elements 54, 56 are secured at opposite ends of shaft 12 by means of pins or rivets 58. With reference to FIGS. 2 and 3, it can be seen that stops 54 an 56 each have a stop surface 60, 62, respectively, which are in a plane passing radially through the axis of the threaded shaft 12. Stops 54 and 56 also each include helical stop surfaces 64 and 66, respectively, which are approximately perpendicular to stop surfaces 60 and 62, respectively. Stop surfaces 60 and 64 of stop element 54 are engaged by stop surfaces 68 and 70, respectively, of nut segment 16. Stop surface 68 of nut segment 16 is helically pitched and is approximately orthogonal to the axis of threaded shaft 12. Stop surface 68 of nut segment 16 engages stop surface 60 of stop element 54 when the split nut is fully retracted toward crank lever 33. Likewise, helical stop surfaces 62 and 66 of stop element 56 are engaged by surfaces of nut segment 17, which are substantially identical to surfaces 68 and 70 of nut segment 16, when the nut is fully extended away from lever 33. By providing stop surfaces 60, 62 which are in a plane passing radially through the axis of the threaded shaft 12, it is possible to positively prevent over-rotation of the drive nut while also preventing jamming or ramping of the split nut against the threads of shaft 12, whereby the rotation of the split nut can be easily reversed without having to apply excessive force, even if the split nut has been tightened against stop element 54 or 56 with excessive force.

Crank lever 33 is mounted to a crank hub 72 by means of a pin or a rivet 74, and crank hub 72 is mounted at one end of externally threaded shaft 12 by means of a pin or a rivet 76. Crank lever 33 is provided with a knob 78 which is rotatable on the distal end 80 of lever 33 and secured thereto by means of a push nut 82. Rotation of the crank lever causes rotation of the threaded shaft 12. Disposed between crank hub 72 and stop element 54 is a pivot bearing 84 which is mounted to a stationary support structure. Accordingly, pivot bearing 84 is stationary and externally threaded shaft 12 rotates within and with respect to pivot bearing 84. In order to enable smooth rotation of stop element 54 with respect to pivot bearing 84 without leaving any substantial gap therebetween, there is provided a thrust bearing 86 which is sandwiched between a pair of thrust washers 87, all of which are disposed on threaded shaft 12 between stop element 54 and pivot bearing 84. A bearing cage 88 is disposed over thrust bearing 86 and thrust washers 87 to conceal the same. Likewise, a thrust bearing, pair of thrust washers, and a bearing cage are also disposed between pivot bearing 84 and crank hub 72. While the illustrated embodiment utilizes a hand crank, it should be understood that the screw drive mechanism of the invention can be operated by various other actuator means, such as an electric motor.

It is noteworthy that the mechanical arrangement utilizes a simple screw shaft 12 which is free of any machined shoulders thus reducing the complexity of the screw shaft and cost thereof as compared with many screw shafts which are utilized in known screw drive mechanisms. All of the parts of the mechanism are located on the threads of shaft 12, or pins set in cross holes through the threaded shaft 12.

A dust sleeve 90 is provided to conceal and protect the screw shaft 12, stop elements 54, 56, the drive nut, and the end of drive member 18 in which the drive nut is received. Dust sleeve 90 also prevents inadvertent contact with moving parts of the mechanism which could snag clothing or pinch fingers.

The screw drive mechanism of the invention is extremely simple to assemble. A suitable procedure would be to, first, pin or rivet stop elements 54 and 58 to threaded shaft 12. Thereafter, thrust bearing 86, thrust washers 87 and bearing cage 88 can be positioned adjacent to stop element 54 as previously described. Pivot bearing 84 can then be positioned on shaft 12, and a thrust bearing, thrust washers and bearing cage can be positioned over shaft 12 on the other side of pivot bearing 84. Crank hub 72 can then be pinned or riveted to shaft 12 and lever 33 can be pinned or riveted to hub 72. A push nut 82 can be used to retain knob 78 on lever 33. Assemble of the drive nut and attachment of the drive nut to drive member 18 is relatively simple. Either segment 16 or 17 is first positioned on shaft 12 with internal threads of the nut segment properly engaging the external threads of shaft 12. The internal threads of the other nut segment are automatically aligned with the external threads of shaft 12 when pins 50 and recesses 52 of one of the nut segments are properly aligned with those of the other nut segment. Spring clips 20 and 21 are then held in appropriate engagement with the recesses 30 on the outer surfaces of nut segment 16, 17. With nut segments 16, 17 and spring clips 20, 21 properly held together on shaft 12, the entire assembly is inserted into the hollow end of drive member 18 with the tabs 32 on spring clips 20, 21 being properly aligned with apertures 34 on drive member 18. The assembly is pushed forward into the hollow end of the drive member 18 until tabs 32 spring outwardly to engage apertures 34. Assembly is preferably completed by sliding a dust sleeve 90 over drive member 18 and shaft 12 and appropriately fastening it to pivot bearing 84.

Disassembly of the mechanism is also relatively easy and generally involves merely reversing the above described assembly procedures. More specifically, removal of the drive nut and threaded shaft 12 merely requires depressing tab 32 downwardly toward shaft 12 while pulling shaft 12 or a part attached thereto away from drive member 18.

From the above description it should be evident that the invention provides a simpler more efficient screw drive mechanism which is easily assembled and disassembled. More specifically, the use of a segmented nut allows the nut to be installed onto the threaded shaft without needing to actually thread the nut onto the shaft. Additionally, the use of spring clips 20, 21 provides a snap-together assembly having a very compact structure.

The embodiments of the invention in which an exclusive property or privilege is claimed are defined as follows:

1. A screw drive mechanism for articulated beds comprising:

an axially rotatable drive shaft having external screw threads;

a segmented drive nut having internal threads which engage said external threads of said drive shaft;

a linearly movable drive member having a hollow interior end portion in which said segmented drive nut is closely received and retained; and at least one spring clip disposed radially between said segmented drive nut and an interior end portion of said drive member and engaging said segmented drive nut and said drive member to prevent translation of said segmented drive nut relative to said drive member when said drive shaft is rotated.

2. The screw drive mechanism of claim 1, wherein one of said drive nut and said drive member includes a radially extending projection, and the other of said drive nut and said drive member includes a radially extending slot in which said radially extending projection is closely received when said drive nut is received in the interior end portion of said drive member to positively connect said drive nut to said drive member to prevent rotation of said segmented drive nut with respect to said drive member.

3. The screw drive mechanism of claim 2, wherein said drive nut includes a recessed exterior portion in which said spring clip is received to achieve a low profile construction.

4. The screw drive mechanism of claim 3, wherein said spring clip is comprised of a generally rectangular shaped piece of metal sheet having a central portion with a tab which extends radially outwardly, and a pair of adjacent wing portions which are bent out of the plane of the central portion to engage exterior walls of said segmented nut.

5. The screw drive mechanism of claim 4, wherein said spring clip is stamped from metal sheet material.

6. The screw drive mechanism of claim 5, wherein said radially outwardly projecting tab of said spring clip projects through and engages an aperture on the wall of said drive member, whereby said drive nut can be axially positioned and retained within an interior end portion of said drive member by holding said at least one spring clip in engagement with the outer surfaces of said segmented nut, and inserting the segmented nut into an end of the drive member and pushing inwardly until said tab springs outwardly and engages said aperture in said drive member.

7. The screw drive mechanism of claim 1, wherein said segmented drive nut is comprised of a plurality of segments having interfitting alignment elements.

8. The screw drive mechanism of claim 7, wherein said interfitting alignment elements are comprised of at least one projection which extends outwardly from a mating surface on a first segment of said drive nut and a recess in a mating surface on a second segment of said drive nut, said projection being configured to be received in said recess to facilitate proper alignment and assembly of said screw drive mechanism.

9. The screw drive mechanism of claim 8, wherein said first and second segments of said dive nut are identical.

10. The screw drive mechanism of claim 9, wherein said first and second segments are comprises of molded plastic.

11. The screw drive mechanism of claim 1, wherein said segmented drive nut includes recesses on radially outward surfaces thereof, and wherein said spring clip is comprised of a resilient sheet material having portions adapted to be received within said recesses on said drive nut and a tab portion which is resiliently biased outwardly away from said drive nut.

12. The screw drive mechanism of claim 1, further comprises a pair of stop elements secured to opposite ends of said threaded shaft.

13. The screw drive mechanism of claim 12, wherein said stop elements include a stop surface which is in a plane passing through the rotational axis of said threaded shaft.

14. The screw drive mechanism of claim 13, wherein said stops include a helical stop surface which is generally perpendicular to the rotational axis of said threaded shaft.

15. The screw drive mechanism of claim 14, wherein said shaft is externally threaded along its entire length.

16. A screw drive mechanism for articulated beds, comprising:

an axially rotatable drive shaft having external screw threads;

a segmented drive nut having internal threads which engage said external threads of said drive shaft;

a linearly movable drive member having a hollow interior end portion in which said segmented drive nut is closely received and retained; and at least one spring clip disposed radially between said segmented drive nut and an interior end portion of said drive member, said spring clip including a tab which extends radially outwardly and projects through and engages an aperture on the wall of said drive member, whereby said drive nut can be axially positioned and retained within an interior end portion of said drive member by holding said at least one spring clip in engagement with the outer surfaces of said segmented nut, and inserting the segmented nut into an end of the drive member and pushing inwardly until said tab springs outwardly and engages said aperture in said drive member.

17. The screw drive mechanism of claim 16, wherein one of said drive nut and said drive member includes a radially extending projection, and the other of said drive nut and said drive member includes a radially extending slot in which said radially extending projection is closely received when said drive nut is received in the interior end portion of said drive member to positively connect said drive nut to said drive member to prevent rotation of said segmented drive nut with respect to said drive member.

18. The screw drive mechanism of claim 16, wherein said segmented drive nut is comprised of a plurality of segments having interfitting alignment elements.

19. The screw drive mechanism of claim 20, wherein said interfitting alignment elements are comprised of at least one projection which extends outwardly from a mating surface on a first segment of said drive nut and a recess in a mating surface on a second segment of said drive nut, said projection being received in said recess to facilitate proper alignment and assembly of said screw drive mechanism.

20. The screw drive mechanism of claim 19, wherein said first and second segments of said drive nut are identical.

* * * * *